Dec. 18, 1956     R. E. YOUNG     2,774,376
TRANSMISSION CONTROL
Filed May 24, 1951
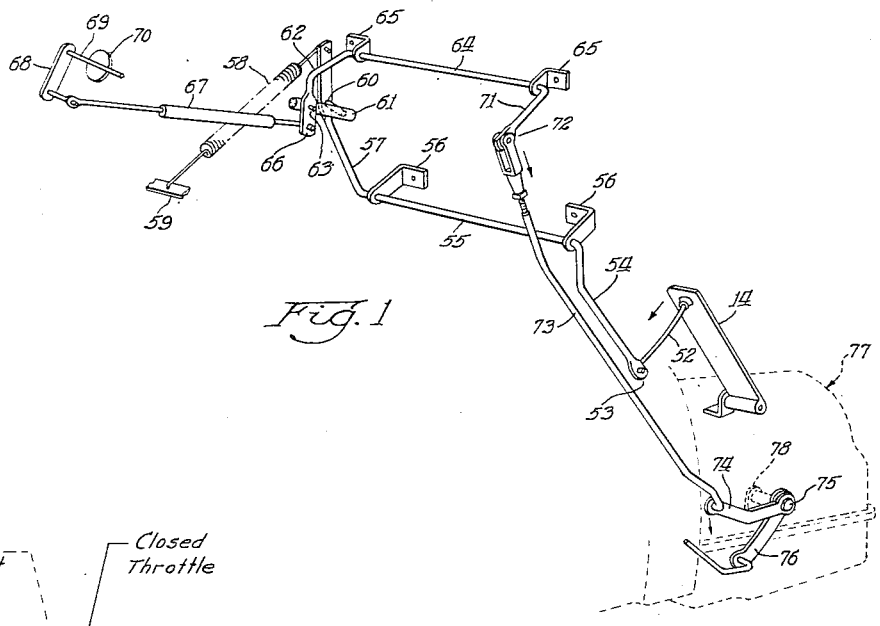
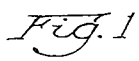
Fig. 1
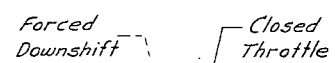
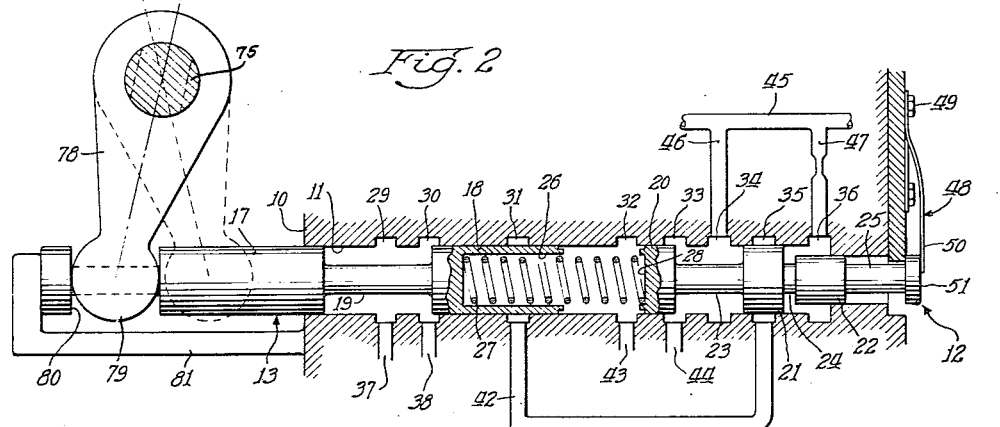
Fig. 2
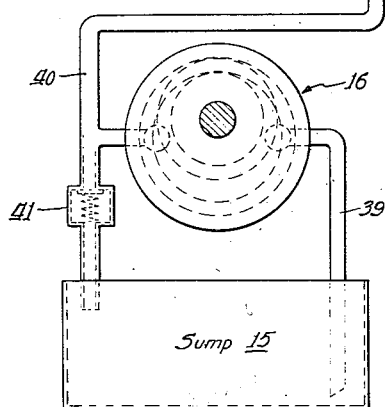
Inventor:
Richard E. Young
By: Frank C. Parker
Atty

United States Patent Office 2,774,376
Patented Dec. 18, 1956

2,774,376

TRANSMISSION CONTROL

Richard E. Young, Muncie, Ind., assignor to Borg-Warner Corporation, Chicago, Ill., a corporation of Illinois Application May 24, 1951, Serial No. 228,038

2 Claims. (Cl. 137—620)

The present invention relates generally to automatic transmissions for automotive vehicles and more particularly to fluid control systems for such transmissions.

The present invention is directed principally to manually operated valves which are designed to supply fluid pressure that varies in accordance with the degree of displacement of the valve from a retracted position. Valves of this type are of particular utility in automatic automotive vehicle transmission control systems wherein it is necessary to provide a variable fluid pressure that increases as the vehicle accelerator pedal is depressed. Such an accelerator pedal controlled valve is shown in the copending application of R. W. Wayman, Serial No. 166,136, filed June 5, 1950, and the present invention comprises an improved means for controlling this valve.

It has been found that the accelerator pedal controlled valve, which actually includes both the downshift valve and the throttle valve disclosed in the above referred to Wayman application, since it is returned to a retracted position by the variable pressure which the valve itself provides, sometimes sticks slightly just before it reaches its retracted position and fails to completely reach such position. This sticking of the valve may be due to such things as high oil viscosity, particularly in cold weather, minor irregularities on the surfaces of the valve and the valve bore, etc. Due to these factors, the valve sometimes does not slide freely and the low variable pressure which returns the valve to its retracted position is not always sufficient to invariably retract the valve. When the valve is not fully retracted, a low residual pressure, of the order of one to five pounds per square inch, is maintained and this interferes with the proper operation of the other parts of the control system. For example, such residual pressure has been found to hinder the proper operation of the low regulator valve, the 3–2 shift control valve and the compensator valve, all of which are shown in the aforementioned Wayman patent application, and because of this interference several of the automatic shifts are rough. Particularly the downshift from third to second forward speed drive, when the throttle is substantially closed or open very slightly, is quite rough. This roughening of the shift is brought about because of the improper timing of the engagement and disengagement of the different controlling clutches and brakes.

The principal object of the present invention is therefore to provide means for improving the operation of the downshift and throttle valves referred to in the aforementioned Wayman application.

A more specific object of the invention is to provide a positive connection between the vehicle accelerator pedal and the downshift valve of an automotive vehicle transmission control system so that upon release of the accelerator pedal, the downshift valve is automatically retracted and the variable fluid pressure controlled by the throttle valve, associated with the downshift valve, is effective to return the throttle valve to its retracted position.

The above and other objects and advantages of the present invention will become apparent from the following detailed description, when read in conjunction with the accompanying drawing, wherein:

Fig. 1 is a schematic view showing the linkage between the accelerator pedal of an automotive vehicle and the hydraulic control valve controlled thereby; and Fig. 2 is a fragmentary schematic hydraulic circuit diagram showing the accelerator controlled valve and the connection between the accelerator positioned lever and the downshift valve.

As stated heretofore, the present invention is particularly applicable to the above referred to Wayman transmission control system and for a thorough understanding of such control system reference should be had to said case. Only those features of the Wayman control system have been shown herein which are deemed necessary for a thorough understanding of the present invention.

With reference now to the drawing, wherein like reference numerals in the different views identify identical parts throughout, and first referring to Fig. 2, a valve casing 10 is bored, as at 11, for receiving a throttle valve 12 and a downshift valve 13. The downshift valve 13 is positively connected to an accelerator pedal 14 by means of the linkage shown in Fig. 1 and this linkage will be described more fully hereinafter. An oil sump 15 is provided for maintaining a supply of oil and an oil pump 16 is provided for pumping the oil from the sump 15 and supplying it under pressure.

The downshift valve 13 is provided with a pair of lands 17 and 18 which are separated by means of a peripheral groove 19. The throttle valve 12 is provided with lands 20, 21 and 22 and also has three grooves 23, 24 and 25. The downshift valve 13 is internally bored, as at 26, and has a compression spring 27 seated within this bore. The compression spring 27 is also seated within a shallow counterbore 28 formed in the end of the throttle valve 12 and thus there is a resilient connection between the downshift valve 13 and the throttle valve 12.

The casing 10 is provided with a plurality of peripheral grooves surrounding the bore 11. These peripheral grooves are identified respectively by reference numerals 29—36. The grooves 29 and 30 are respectively connected with conduits 37 and 38, which correspond respectively with conduits 345 and 344 in the above-mentioned Wayman application.

When the pump 16 operates, fluid is pumped from the sump 15 through a conduit 39 and through the pump 16, and is then pumped out under pressure through a conduit 40. The conduit 40 is connected with the grooves 31 and 35, and a pressure relief valve 41 insures that the pressure in the conduit 40 will not be too high. A branch conduit 42, connecting the conduit 40 with the groove 31, corresponds to the conduit 359 in the above-mentioned Wayman case. The grooves 32 and 33 are respectively connected with a pair of bleed conduits 43 and 44. The grooves 34 and 36 are respectively connected to a conduit 45 by means of conduits 46 and 47. The conduit 45 corresponds to the conduit 332 in the above referred to Wayman case.

A leaf spring 48, which is also disclosed in the copending application of C. H. Baker, Serial No. 218,203, filed March 29, 1951, now Patent No. 2,733,732, is bolted to the casing 10 by means of a pair of bolts 49 and its free end 50 engages the end 51 of the valve 12 and biases the valve to the left, or toward its retracted position.

The leaf spring 48 is many times weaker than the compression spring 27 and upon depression of the accelerator pedal 14, which tends to compress the compression spring 27, the throttle valve 12 is moved to the right in substantially the same manner as it would be moved were there no leaf spring 48 engaging the valve.

The accelerator pedal 14 is pivotally mounted, as indicated, and has a push rod 52 rigidly secured thereto, The push rod 52 is pivotally connected, as indicated at 53, to one arm 54 of a double armed lever 55 which is pivotally mounted as indicated at 56. The other arm 57 of the lever 55 is connected at its extremity with one end of a tension spring 58, the other end of the spring being fastened to any convenient stationary part 59. Depression of the accelerator pedal 14 pivots the lever 55 clockwise and places the spring 58 under tension and therefore, upon release of the accelerator pedal 14, the spring 58 functions to return the lever 55 counterclockwise and the accelerator pedal 14 to its released position.

The arm 57 of the lever 55 carries a pivot stud 60 which is pivotally connected to a link 61. The link 61 is also pivotally connected, as indicated at 63, to an arm 62 of a lever 64 pivotally mounted as indicated at 65. The arm 62 is also pivotally connected as indicated at 66, to an adustable lever 67. The lever 67 is pivotally connected to a lever 68 that is pivotal with the pivot shaft 69 of a butterfly valve 70. The butterfly valve 70 is shown in its closed throttle position and upon depression of the accelerator pedal 14, which causes clockwise rotation of the lever 55 and counterclockwise rotation of the lever 64, the link 67 causes the lever 68 and butterfly valve 70 to rotate counterclockwise from the position shown in order to move the butterfly valve 70 toward its open throttle position.

The lever 64 has a second arm 71 which is pivotally connected, as indicated at 72, with a link 73. The link 73 is pivotally secured to a lever 74 which itself is fixedly secured to a rotatable shaft 75. Rotatable about the shaft 75 is a lever 76 which is connected with a selector valve shown in the aforementioned Wayman application. The shaft 75 extends through the transmission casing, indicated generally by reference numeral 77, and on its inner end carries a lever 78 rigidly secured thereto. The lever 78 is formed with a rounded end portion 79 which is seated within a groove 80 formed in the downshift valve 13. A stop member 81 is secured to the casing 10 and serves to limit movement of the downshift valve 13 to the left when the accelerator pedal 14 is moved to its closed throttle position. As has been stated, depression of the accelerator pedal 14 results in counterclockwise rotation of the lever 64 and this, in turn, pushes the link 73 downwardly to thereby rotate the shaft 75 counterclockwise. Counterclockwise movement of the shaft 75 causes the lever 78 to move the downshift valve 13 to the right. When the accelerator pedal 14 is released the tension spring 58 returns it to its closed throttle position and also functions to raise the link 73, thereby causing the shaft 75 and lever 78 to be pivoted clockwise to the position thereof shown in Fig. 2. This clockwise rotation of the lever 78 returns the downshift valve 13 to its retracted or closed throttle position.

The operation of the present invention is as follows. When the accelerator pedal 14 is depressed sufficiently to cause movement of the downshift valve 13 to the right a sufficient distance to compress the spring 27 and thus move the throttle valve 12 to the right so as to uncover the groove 35, fluid under pressure from the pump 16 passes through the conduit 40 into the groove 35. The land 21 on the valve 12 functions in cooperation with the edge of the groove 35 to meter the fluid so that the pressure of the fluid in the groove 23 is somewhat less than that in the groove 35, and is substantially proportional to the degree of displacement of the throttle valve 12 to the right out of its retracted position. The metered fluid in the groove 23 passes through the groove 34, through the conduits 46, 45 and 47 and into the groove 36 and groove 24. Due to the fact that the land 21 has a larger diameter than the land 22, there is a differential action upon the valve 12 tending to move it to the left. It is therefore apparent that the fluid pressure in the groove 24 between the two lands 21 and 22, which fluid pressure varies according to the displacement of the valve 12 to the right, opposes the action of the compression spring 27 and consequently differentially positions the valve 12, the compression spring 27 tending to urge it to the right, away from the retracted position which it assumes when the accelerator pedal 14 occupies its closed throttle position, and the variable fluid pressure in the groove 24 tending to move the valve 12 to the left, toward its retracted position.

The further the accelerator pedal 14 is depressed, the greater the compression of the spring 27, and consequently the greater the tendency for the valve 12 to be moved to the right. However, when the valve 12 moves to the right, the opening between the land 21 and the groove 35 increases and the variable pressure in the groove 24 also increases so that the force tending to move the valve 12 to the left is likewise greater. Upon a release of the accelerator pedal 14 the tension spring 58 returns it to its closed throttle position and also causes the lever 78 to move the downshift valve 13 to the position shown in Fig. 2. This movement of the downshift valve 13 to its retracted position renders the compression spring 27 substantially ineffective to exert any force upon the valve 12 and the variable fluid pressure in the groove 24 then need only return the valve 12 to its retracted position.

When the accelerator pedal 14 is moved from its open throttle position to its closed throttle position, the variable fluid pressure in the groove 24, as it moves the valve to the left, decreases, and accordingly the force tending to move the valve 12 to the left also decreases. However, so long as there is any opening between the land 21 and the groove 35 there will be some pressure in the groove 24 and consequently the variable fluid pressure in the groove 24 is usually sufficient to return the valve 12 to the left until the land 21 blocks the groove 35.

The positive connection from the accelerator pedal 14 to the downshift valve 13 obviously causes the downshift valve 13 to be returned automatically to its retracted position, without relying upon the variable fluid pressure in the groove 24 acting upon the valve 12 which, in turn, would have to act through the compression spring 27 upon the valve 13 in order to return the valve 13 to its retracted position, if it were not for the positive connection between the valve 13 and the accelerator pedal 14. Thus the undesirable result accompanying the use of a downshift valve which is not positively retracted upon the release of the accelerator, is now alleviated by the present invention. If there is any tendency for the throttle valve 12 to stick without returning to its retracted position when the accelerator pedal is released, the slight spring pressure exerted by the leaf spring 48 has been found to be sufficient, when acting in conjunction with the diffierential fluid pressure in the groove 24, to return the throttle valve 12 to its retracted position.

With the improvements disclosed in the present invention the transmission control system of the type disclosed in the aforementioned Wayman application has been found to function more satisfactorily even though conditions might be such as would cause sticking of the valves without the improvements disclosed herein.

It is contemplated that numerous changes and modifications may be made in the present invention without departing from the spirit or scope thereof.

I claim:

1. In a fluid pressure regulating system the combination of a manually positionable control lever depressible from one limit position toward another, a spring for returning the lever to its said one limit position upon the manual release of the lever; a source of fluid pressure, fluid pressure control means connected with said source and including a first valve and a second valve resiliently connected with the first valve, linkage positively connecting said first valve and said control lever and including a pivotal member having a rounded portion that fits into a slot in the first valve so that movement of the control lever pivots the pivotal member and moves the first valve longitudinally, said first valve functioning upon depression of the control lever to bias the second valve away from a retracted position, a land on said second valve and one side of the land being effective for metering the fluid pressure supplied by said source and supplying a fluid pressure substantially proportional to the degree of displacement of the second valve from its retracted position, and means for applying the last-mentioned fluid pressure to the opposite side of said land on said second valve to oppose the bias on the second valve by the first valve through the resilient connection, said first valve being returned to a retracted position by the action of said spring upon the manual release of said lever to thereby relieve the bias on the second valve away from its said retracted position and said last-mentioned fluid pressure at this time being effective to urge the second valve toward its said retracted position.

2. In a fluid pressure regulating system, the combination of a control member being manually depressible from one limit position toward another, a spring for returning the control member to its said one limit position upon the manual release thereof, a source of fluid pressure, fluid pressure control means connected with said source and including a first valve positively responsive to movement of said control member and a second valve resiliently connected with the first valve so that upon movement of the control member toward its other limit position the second valve is biased from a retracted position, means associated with the second valve and including a land on the valve for metering the fluid pressure supplied by said source and supplying a fluid pressure substantially proportional to the degree of displacement of the second valve from its retracted position, means including a fluid passage for receiving a portion of the metered pressure fluid and for applying the last-mentioned fluid pressure to a portion of said second valve land opposite to said metering means to oppose the bias on the second valve by the first valve through the resilient connection, said first valve being moved to a retracted position by the action of said spring upon the manual release of said control member to thereby relieve the bias on the second valve away from its said retracted position and said last-mentioned fluid pressure at this time being effective to urge the second valve toward its said retracted position, and a leaf spring operatively associated with said second valve for acting in concert with said last-mentioned fluid pressure to insure the movement of said second valve toward its retracted position upon release of said control member.

References Cited in the file of this patent

UNITED STATES PATENTS

| Number | Name | Date |
|---|---|---|
| 347,041 | Hopkins | Aug. 10, 1886 |
| 464,018 | Goubert | Dec. 1, 1891 |
| 1,620,315 | Baker | Mar. 8, 1927 |
| 2,347,321 | Huber | Apr. 25, 1944 |
| 2,358,644 | Kelley | Sept. 19, 1944 |
| 2,359,423 | Johnson | Oct. 3, 1944 |
| 2,373,450 | Boldt | Apr. 10, 1945 |